United States Patent [19]
Alvaro et al.

[11] Patent Number: 6,081,092
[45] Date of Patent: Jun. 27, 2000

[54] DRIVER CIRCUIT FOR A SYNCHRONOUS, ALTERNATING CURRENT ELECTRIC MOTOR

[75] Inventors: Nicolino Alvaro, Turin; Sebastiano Acquaviva, Pino Torinese, both of Italy

[73] Assignee: Plaset Spa, Moncalieri, Italy

[21] Appl. No.: 09/232,565

[22] Filed: Jan. 15, 1999

[30] Foreign Application Priority Data

Jan. 15, 1998 [IT] Italy .................................. TO98A0027

[51] Int. Cl.[7] ........................................................ H02P 1/46
[52] U.S. Cl. ......................... 318/700; 318/430; 318/724
[58] Field of Search .................................. 318/138, 254, 318/430, 431, 432, 439, 700, 716, 720, 722, 724

[56] References Cited

U.S. PATENT DOCUMENTS

| | | | |
|---|---|---|---|
| 4,300,077 | 11/1981 | Katz et al. ................................ | 318/812 |
| 4,769,581 | 9/1988 | Rilly ......................................... | 318/254 |
| 4,780,652 | 10/1988 | Rilly ......................................... | 318/254 |
| 4,843,295 | 6/1989 | Thompson et al. ...................... | 318/786 |
| 5,434,491 | 7/1995 | Marioni .................................... | 318/700 |

FOREIGN PATENT DOCUMENTS

| | | |
|---|---|---|
| 05748232 | 12/1993 | European Pat. Off. . |
| 53-050411 | 5/1978 | Japan . |
| 05252708 | 1/1994 | Japan . |

*Primary Examiner*—Bentsu Ro
*Attorney, Agent, or Firm*—Arnold, White & Durkee

[57] ABSTRACT

The driver circuit (10) comprises a first triac or the like (11) for connection in series with the stator winding (5, 6) of the motor between the terminals (12, 13) of an alternating-current voltage supply, the gate of the first triac (11) being arranged for connection to an intermediate point (C) of the stator winding (5, 6) of the motor (M). A second triac or the like (15) is connected between the intermediate point (C) of the winding (5, 6) and the terminal (13) of the voltage supply to which the first triac (11) is connected. A control circuit (15-27) is connected to the gate of the second triac (15) such that, each time the motor (M) is connected to the voltage supply, it initially makes the second triac (15) conductive and consequently cuts off the first triac (11) for a predetermined initial period of time, and cuts off the second triac (15) and allows the first triac (11) to become conductive after this period of time.

2 Claims, 2 Drawing Sheets

DRIVER CIRCUIT FOR A SYNCHRONOUS, ALTERNATING CURRENT ELECTRIC MOTOR

BACKGROUND OF THE INVENTION

The present invention relates to a driver circuit for a synchronous alternating-current motor.

More specifically, the subject of the invention is a driver circuit for a synchronous motor comprising a stator with at least one winding arranged around a substantially U- or C-shaped pack of magnetic plates between the pole ends of which a permanent- magnet rotor is mounted for rotation.

Alternating-current synchronous motors of this type are used, for example, for driving pumps such as pumps for aquariums or for household appliances.

A problem with these motors is that, upon starting, they typically develop a very low torque which is generally insufficient to overcome the resisting torque offered by the load, for example, the resisting torque of a pump rotor immersed in a liquid.

Various solutions, mostly of a mechanical nature, have been proposed for addressing this problem. For example, in one known solution, the rotor of the motor is disconnected from the load upon starting and is then connected thereto only after a certain angular displacement has been performed.

A coupling for achieving a mechanical connection of this type between the rotor and the load of a synchronous alternating-current motor is described, for example, in European patent application No. 0 207 430.

Couplings of this type, however, have the disadvantage of being quite noisy in operation.

The object of the present invention is to provide a driver circuit for a synchronous, alternating-current motor of the type specified above which addresses shortcomings associated with the prior art.

SUMMARY OF THE INVENTION

In one aspect of the present invention, a driver circuit is presented for a synchronous, alternating-current motor comprising a stator with at least one winding arranged around a substantially U- or C-shaped pack of magnetic plates between pole ends of which a permanent-magnet rotor is mounted for rotating. The driver circuit includes a first triac connected in series with the winding between a terminal of an alternating-current voltage supply. The first triac has a gate connected to an intermediate point of the stator winding of the motor. A second triac is connected between the intermediate point of the winding of the motor and the terminal of the voltage supply to which the first triac is connected. A control circuit is connected to the gate of the second triac that is operable to, each time the motor is connected to the voltage supply, initially make the second triac conductive and consequently cut off the first triac for a predetermined initial period of time, and cut off the second triac and allow the first triac to become conductive after the predetermined initial period of time, so that, during the predetermined initial period of time, only a portion of the winding of the motor is connected to the voltage supply by via the second triac and, after the predetermined initial period of time, the whole winding of the motor is connected to the voltage supply.

BRIEF DESCRIPTION OF THE DRAWINGS

Other objects and advantages of the invention will become apparent upon reading the following detailed description and upon reference to the drawings in which.

Figure 1:
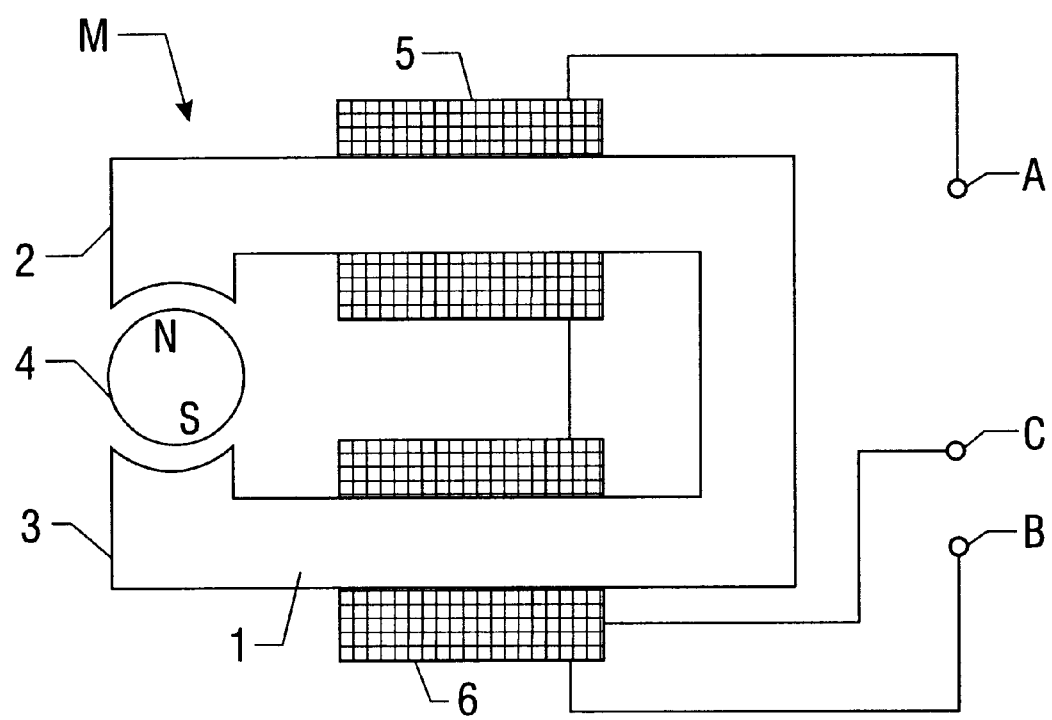
FIG. 1 is a schematic illustration of a synchronous, alternating-current electric motor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In FIG. 1, a synchronous, alternating-current electric motor is generally indicated M. This motor comprises, in known manner, a stator with a substantially U- or C-shaped pack of magnetic plates 1 between the pole ends 2 and 3 of which a permanent-magnet rotor 4 is mounted for rotating. The stator of the motor M comprises, a winding which, in the embodiment shown by way of example, is divided into two coils 5 and 6 wound on the two arms of the pack of plates 1 and connected in series with one another between the two terminals A and B.

A third terminal, indicated C, of the stator winding of the motor M is connected to an intermediate point of the coil 6.

Although in the embodiment shown in FIG. 1 the stator winding shown is divided into two coils, the invention is not in fact limited to such an embodiment but also extends to embodiments in which the stator winding is constituted by a single coil wound around the pack of plates and having two end terminals A and B and an intermediate terminal C.

Figure 2:
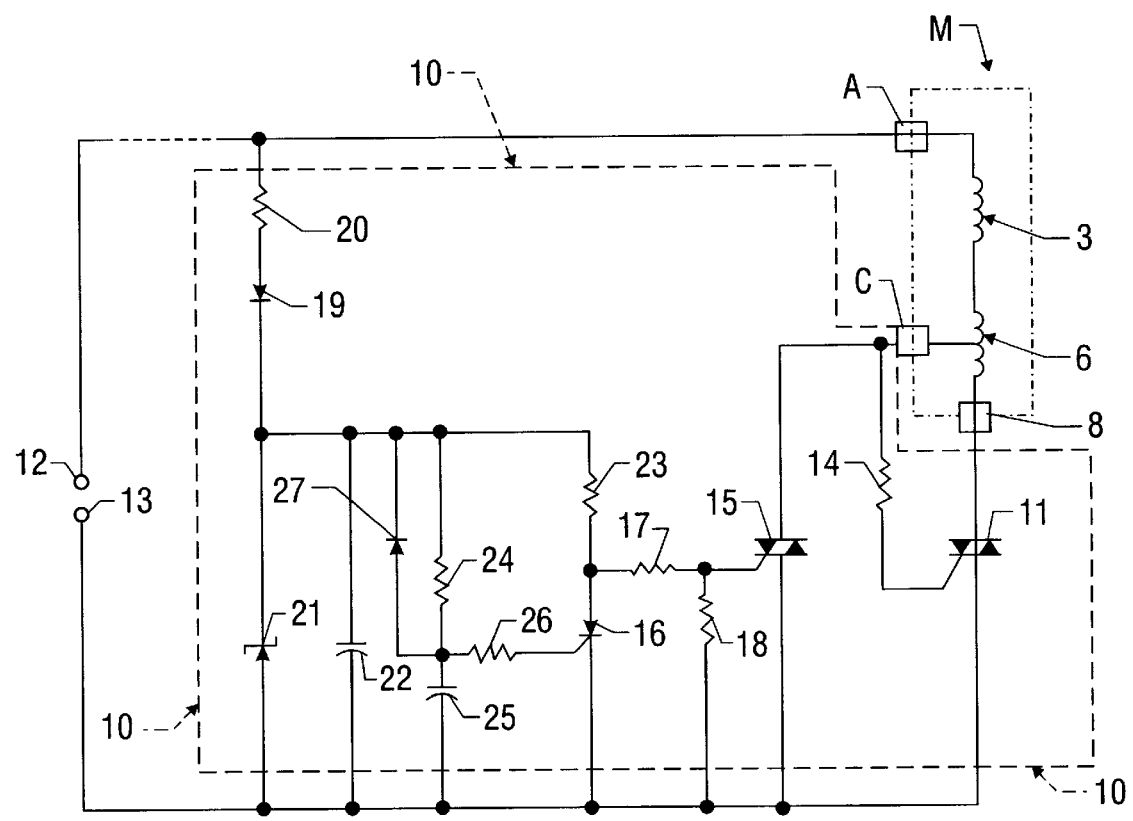
FIG. 2 is a circuit diagram of an embodiment of a driver circuit according to the invention.

In FIG. 2, a circuit for driving the motor M is generally indicated 10. This circuit comprises a triac 11 connected in series with the winding 5, 6 of the motor M between the terminals 12 and 13 of an alternating-current voltage supply such as, for example, the mains voltage. The gate of the triac 11 is connected to the intermediate terminal C of the stator winding of the motor by means of a resistor 14.

A second triac disposed between the intermediate terminal C of the stator winding of the motor and the terminal 13 of the alternating voltage supply is indicated 15. The gate of the triac 15 is connected to the anode of an SCR 16 by means of a resistive divider formed by two resistors 17, 18.

The SCR 16 has its cathode connected to the terminal 13 of the alternating voltage supply.

The circuit 10 also comprises a stabilized voltage supply circuit including a rectifier diode 19 connected to the terminal 12 of the alternating voltage supply by means of a resistor 20. A stabilizing Zener diode 21 is connected between the cathode of the rectifier diode and the terminal 13 of the alternating voltage supply. A smoothing capacitor 22 is connected in parallel with this Zener diode.

The anode of the SCR 16 is connected to the cathode of the Zener diode 21 by means of a resistor 23.

An RC unit including a resistor 24 and a capacitor 25 is arranged in parallel with the capacitor 22.

The gate of the SCR 16 is connected to the junction between the resistor 24 and the capacitor 25 by means of a resistor 26.

A diode 27 has its anode connected to the resistor 26 and its cathode connected to that of the Zener diode 21.

The driver circuit described above operates in the following manner.

When an alternating voltage is applied between the terminals 12 and 13, initially, the capacitor 25 is discharged and the SCR 16 is non-conductive.

A direct current can flow through the diode 19 and the resistors 23 and 17 towards the gate of the triac 15 which becomes conductive. The conduction of current in the triac 15 allows a corresponding current to flow through the portion of the stator winding of the motor M disposed between the terminals A and C. The triac 11, on the other hand, is cut off.

Since the impedance of the portion of the stator winding disposed between the terminals A and C is less than that of the winding as a whole, during the initial stage, a current of relatively high strength corresponding to a similarly high torque sufficient to start the motor, flows in this portion of the stator winding.

After a predetermined period of time corresponding to the time required for the voltage in the capacitor 25 to become sufficient to cause the SCR 16 to become conductive, the triac 15 is cut off and the triac 11 can then become conductive.

The changing of the triac 11 to the conductive state causes the current now to flow through the whole of the stator winding of the motor with a normal strength less than that of the current previously flowing in the portion of the stator winding disposed between the terminals A and C.

The circuit 10 according to the invention enables the motor to be started positively by virtue of the initial flow of a current of greater strength than the normal operating current, in a smaller number of turns of the stator winding. This permits the development, at the starting stage, of a torque much higher than that which would be developed if the whole winding were supplied from the outset.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A driver circuit for a synchronous, alternating-current motor comprising a stator with at least one winding arranged around a substantially U- or C-shaped pack of magnetic plates between pole ends of which a permanent-magnet rotor (4) is mounted for rotating, the driver circuit (10) comprising:

a first triac connected in series with the winding between a terminal of an alternating-current voltage supply, the first triac having a gate connected to an intermediate point of the stator winding of the motor;

a second triac connected between the intermediate point of the winding of the motor and the terminal of the voltage supply to which the first triac is connected, and a control circuit connected to the gate of the second triac, the control circuit operable to, each time the motor is connected to the voltage supply:

initially make the second triac conductive and consequently cut off the first triac for a predetermined initial period of time, and cut off the second triac and allow the first triac to become conductive after the predetermined initial period of time, so that, during the predetermined initial period of time, only a portion of the winding of the motor is connected to the voltage supply by via the second triac and, after the predetermined initial period of time, the whole winding of the motor is connected to the voltage supply.

2. A circuit according to claim 1, wherein the control circuit comprises:

a rectifier/voltage stabilizer circuit connected to the alternating voltage supply;

an SCR connected between the output of the rectifier/voltage stabilizer circuit and the gate of the second triac (15); and a timer circuit connected to the rectifier/voltage stabilizer circuit and to the gate of the SCR so that the SCR is made conductive a predetermined period of time after the connection of the motor and of the rectifier/voltage stabilizer circuit to the alternating voltage supply.

* * * * *

UNITED STATES PATENT AND TRADEMARK OFFICE
CERTIFICATE OF CORRECTION

PATENT NO. : 6,081,092
DATED : June 27, 2000
INVENTOR(S) : Nicolino Alvaro and Sebastiano Acquaviva It is certified that error appears in the above-identified patent and that said Letters Patent is hereby corrected as shown below:

On the Title page [75] Inventors, please delete "Turin" and insert therefore --Torino--.

[30] Foreign Application Priority Data, please delete "TO98A0027" and insert -- therefore --TO98A000027--.

Signed and Sealed this

Nineteenth Day of June, 2001

*Attest:*

NICHOLAS P. GODICI
*Attesting Officer*     *Acting Director of the United States Patent and Trademark Office*